United States Patent
Asai et al.

(10) Patent No.: US 9,779,693 B2
(45) Date of Patent: Oct. 3, 2017

(54) IMAGE DATA OUTPUT CONTROL DEVICE, DISPLAY DEVICE, AND RECORDING MEDIUM

(71) Applicant: Sharp Kabushiki Kaisha, Osaka-shi, Osaka (JP)

(72) Inventors: Junki Asai, Osaka (JP); Kenji Maeda, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 56 days.

(21) Appl. No.: 14/422,393

(22) PCT Filed: Jul. 31, 2013

(86) PCT No.: PCT/JP2013/070768
§ 371 (c)(1),
(2) Date: Feb. 19, 2015

(87) PCT Pub. No.: WO2014/038319
PCT Pub. Date: Mar. 13, 2014

(65) Prior Publication Data
US 2015/0235624 A1  Aug. 20, 2015

(30) Foreign Application Priority Data

Sep. 7, 2012 (JP) .................. 2012-197794

(51) Int. Cl.
G09G 5/18 (2006.01)
G09G 3/36 (2006.01)
G06T 1/60 (2006.01)

(52) U.S. Cl.
CPC .................. G09G 5/18 (2013.01); G06T 1/60 (2013.01); G09G 3/3696 (2013.01)

(58) Field of Classification Search
CPC ....... G09G 2360/18; G09G 2340/0435; G09G 2360/06; G09G 2360/12; G09G 2360/126; G09G 2360/128
(Continued)

(56) References Cited

U.S. PATENT DOCUMENTS 6,252,572 B1 * 6/2001 Kurumisawa ........ G09G 3/3625
345/100
6,304,297 B1 * 10/2001 Swan .................... G06F 3/1415
345/501

(Continued)

FOREIGN PATENT DOCUMENTS

JP 2002-278523 A 9/2002
JP 2004-078124 A 3/2004
(Continued)

OTHER PUBLICATIONS

Official Communication issued in International Patent Application No. PCT/JP2013/070768, dated Oct. 29, 2013.

Primary Examiner — Koosha Sharifi-Tafreshi
(74) Attorney, Agent, or Firm — Keating & Bennett, LLP

(57) ABSTRACT

In a case where next image data, corresponding to a next screen, is not supplied from a host even when first predetermined time has elapsed since the first supply of image data was completed, the period control section (32) starts the second supply of the image data, of which the first supply has been carried out, to a liquid crystal display device. In a case where next image data, corresponding to a next frame, is not supplied from the host even when second predetermined time has elapsed since the second supply of the image data was completed, the period control section (32) starts the third supply of the image data to the liquid crystal display device, and sets the first predetermined time to be longer (Continued)

than the second predetermined time. This makes it possible to appropriately update a displayed image.

8 Claims, 5 Drawing Sheets

(58) Field of Classification Search
USPC .................................................. 345/98, 545
See application file for complete search history.

(56) References Cited

U.S. PATENT DOCUMENTS

| | | | |
|---|---|---|---|
| 7,358,948 B2 * | 4/2008 | Shiomi | G09G 3/3648 345/208 |
| 2002/0093473 A1 | 7/2002 | Tanaka et al. | |
| 2004/0036669 A1 | 2/2004 | Yanagi et al. | |
| 2004/0095356 A1 * | 5/2004 | Inoue | G06F 3/038 345/531 |
| 2004/0207589 A1 * | 10/2004 | Kim | G09G 3/3648 345/89 |
| 2005/0104835 A1 * | 5/2005 | Misonou | G09G 3/3614 345/96 |
| 2011/0090183 A1 | 4/2011 | Yamazaki et al. | |
| 2011/0157131 A1 * | 6/2011 | Miyake | G09G 3/3614 345/211 |

FOREIGN PATENT DOCUMENTS

| | | |
|---|---|---|
| JP | 2005-140959 A | 6/2005 |
| JP | 2012-018271 A | 1/2012 |
| KR | 10-2012-0094927 A | 8/2012 |

* cited by examiner

| RESPONSE FRAME COUNTER VALUE | VF SETTING VALUE |
|---|---|
| 2 | VF=VF(mid)=1/30s-Tv |
| 1 | VF=VF(min)=1/60s-Tv |
| 0 | VF=VF(max)=1s-Tv |

(b)

| RESPONSE FRAME COUNTER VALUE | VF SETTING VALUE |
|---|---|
| 2 | VF=VF(mid)=1/24s-Tv |
| 1 | VF=VF(min)=1/60s-Tv |
| 0 | VF=VF(max)=1s-Tv |

(c)

| RESPONSE FRAME COUNTER VALUE | VF SETTING VALUE |
|---|---|
| 2 | VF=VF(mid)=1/15s-Tv |
| 1 | VF=VF(min)=1/60s-Tv |
| 0 | VF=VF(max)=1s-Tv |

IMAGE DATA OUTPUT CONTROL DEVICE, DISPLAY DEVICE, AND RECORDING MEDIUM

TECHNICAL FIELD

The present invention relates (i) an image data output control device for controlling a timing at which image data is supplied to a liquid crystal display section and (ii) a display device including the image data output control device and the liquid crystal display section.

BACKGROUND ART

In general, in a case where image data is transferred from a host (host processor) to a liquid crystal display panel, the image data is supplied to the liquid crystal display panel after being temporarily stored in a frame memory provided in a display control section (LCD controller).

Therefore, in a case where there is no update on displayed data, it is possible to stop transfer of image data from the host to the frame memory, and possible to continue to display an image on the liquid crystal display panel with the use of image data stored in the frame memory.

Patent Literature 1 discloses a technique of reducing electric power consumption by stopping driving circuits for driving a liquid crystal display panel, during a retaining period out of (i) a scanning period (refresh period) during which a scanning line driving circuit scans scanning lines and (ii) the retaining period (non-refresh period) during which the scanning line driving circuit causes electric charges, applied in a previous scanning period, to be retained in liquid crystal instead of scanning the scanning lines.

CITATION LIST

Patent Literature 1

Japanese Patent Application Publication, Tokukai, No. 2004-078124 A (Publication Date: Mar. 11, 2004)

SUMMARY OF INVENTION

Technical Problem

However, according to the technique disclosed in Patent Literature 1, in a case where the non-refresh period switches to the refresh period so that a new image is displayed, a scan corresponding to the new image is carried out in only one frame.

The liquid crystal display panel has a characteristic such that display is carried out while an orientation direction of liquid crystal molecules is being controlled by application of voltages which are based on image data. Therefore, there is a case where application of voltages, which are based on an update image, in only one frame is not sufficient to appropriately display the update image due to an effect of an orientation state of the liquid crystal molecules which state corresponds to an image prior to the update image (voltages applied in a previous frame). That is, capacitances of pixel electrodes vary depending on the orientation state of the liquid crystal molecules which state corresponds to the image prior to the update image, and this apparently causes a change in voltages applied to the pixel electrodes. Therefore, application of the voltages, which are based on the update image, in only one frame does not change the orientation state of the liquid crystal molecules to an orientation state corresponding to image data. Accordingly, the update image may be displayed in a state where the update image is mixed with the image prior to the update image.

The present invention has been made in view of the above problems, and an object of the present invention is to allow a liquid crystal display device to appropriately update a displayed image.

Solution to Problem

An image data output control device in accordance with the present invention is an image data output control device that controls a timing at which image data, corresponding to 1 (one) screen, is supplied to a liquid crystal display section, the liquid crystal display section applying, to respective pixels, voltages which are based on the image data, every time the image data is supplied to the liquid crystal display section, the device including: a memory in which image data is stored; and a period control section for controlling a timing at which the image data stored in the memory is read out and supplied to a liquid crystal display section, the period control section starting the first supply of the image data to the liquid crystal display section, in a case where predetermined time has elapsed since the image data, corresponding to 1 (one) screen, started to be written in the memory, the period control section starting the second supply of the image data, of which the first supply has been carried out, to the liquid crystal display section, in a case where next image data, corresponding to next 1 (one) screen, does not start to be written in the memory even when first predetermined time has elapsed since the first supply of the image data was completed.

Advantageous Effects of Invention

According to an image data output control device of the present invention, it is possible to appropriately control, depending on image data, an orientation state of liquid crystal molecules in each of pixels, regardless of an orientation state of the liquid crystal molecules in the each of the pixels which orientation state corresponds to an image prior to an update image. This makes it possible to appropriately update a displayed image.

Figure 1:
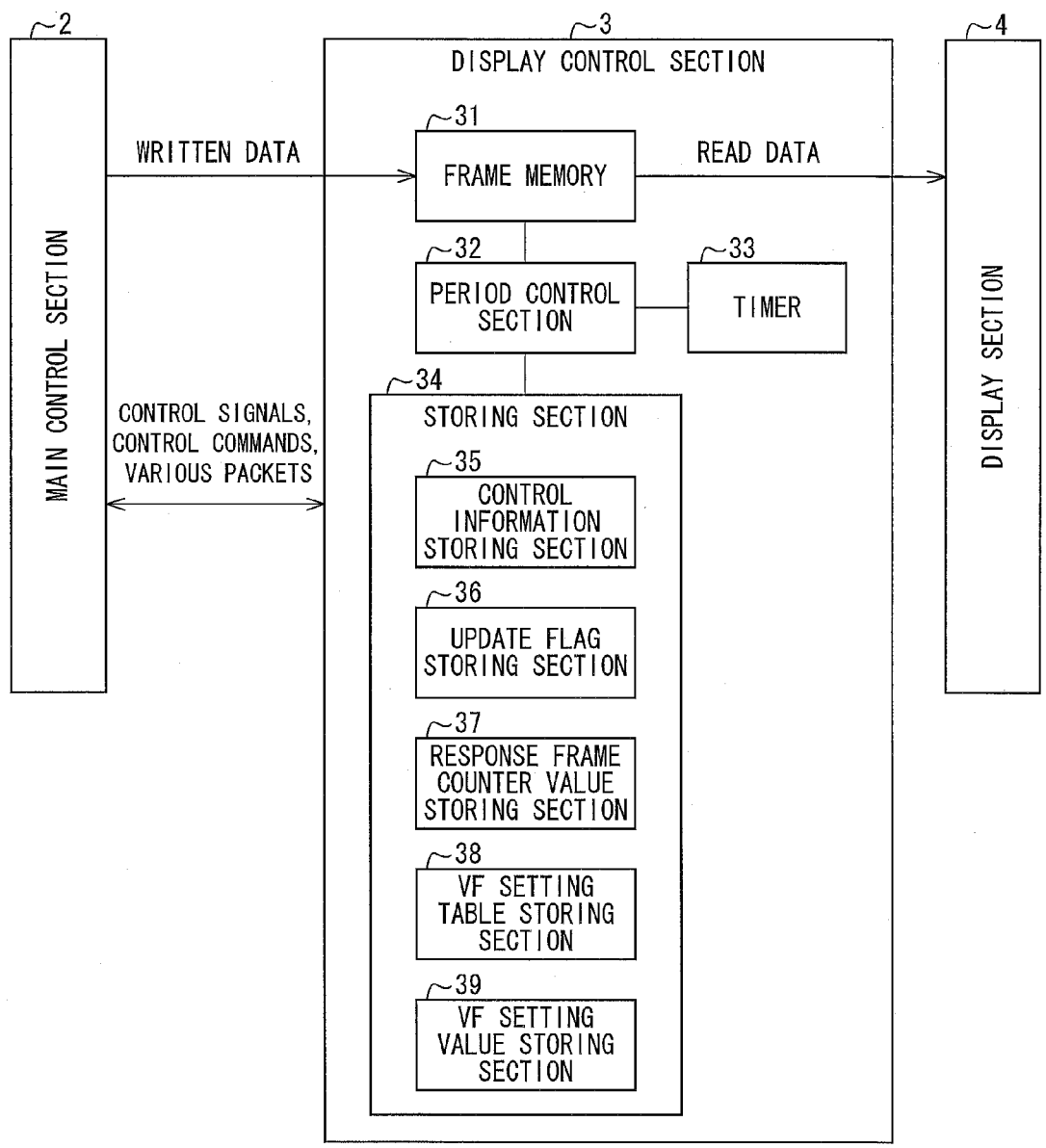
FIG. 1 is an explanatory diagram illustrating a configuration of a display control section (image data output control device) included in a mobile terminal (liquid crystal display device) in accordance with an embodiment of the present invention.

(a) of FIG. 3 is an explanatory view illustrating an example of a VF setting table stored in a VF setting table storing section included in the display control section illustrated in FIG. 1. (b) and (c) of FIG. 3 are explanatory views each illustrating a variation of the VF setting table.

Figure 4:
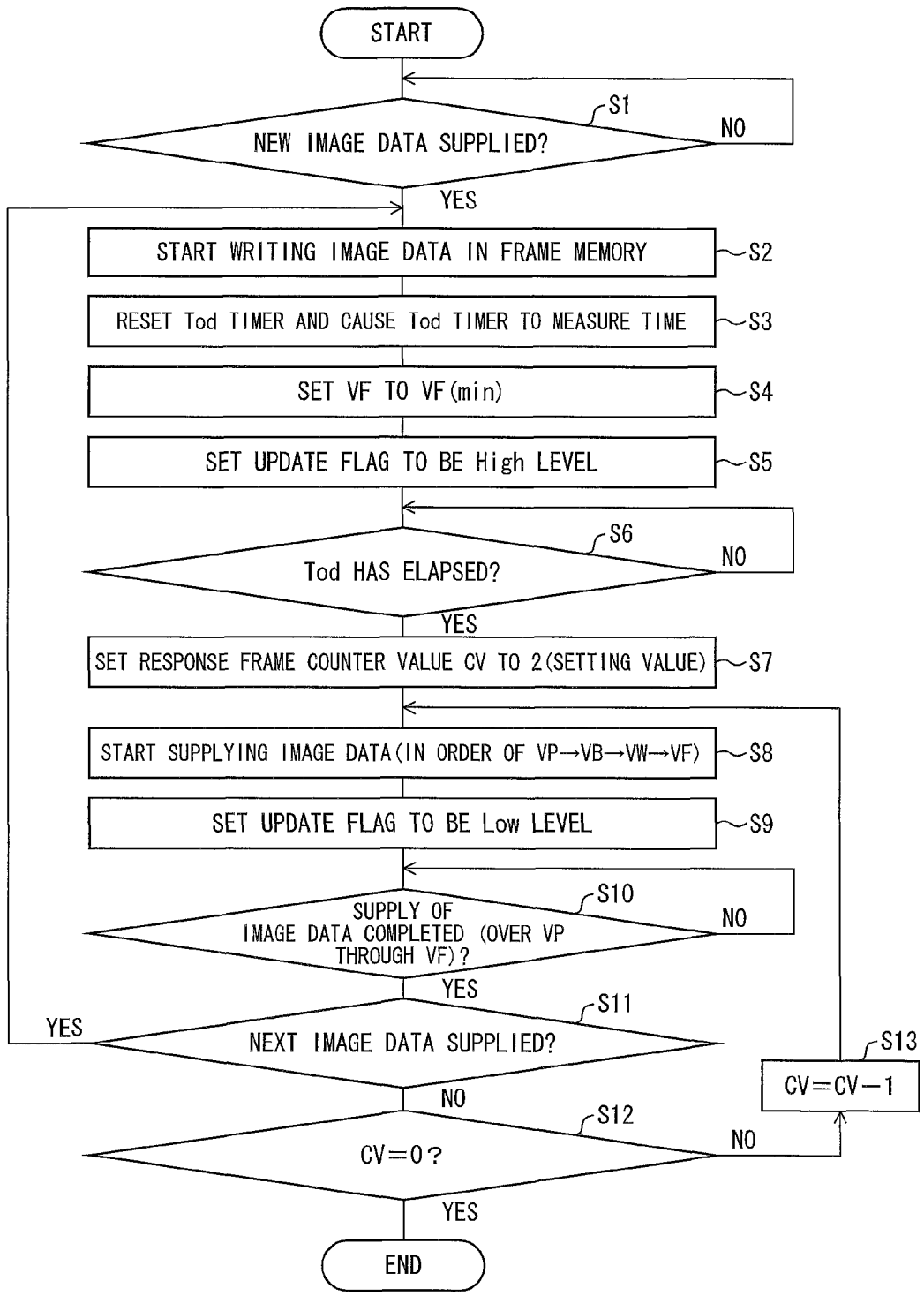

FIG. 4 is a flowchart illustrating a flow of processes carried out by the display control section illustrated in FIG. 1.

Figure 5:
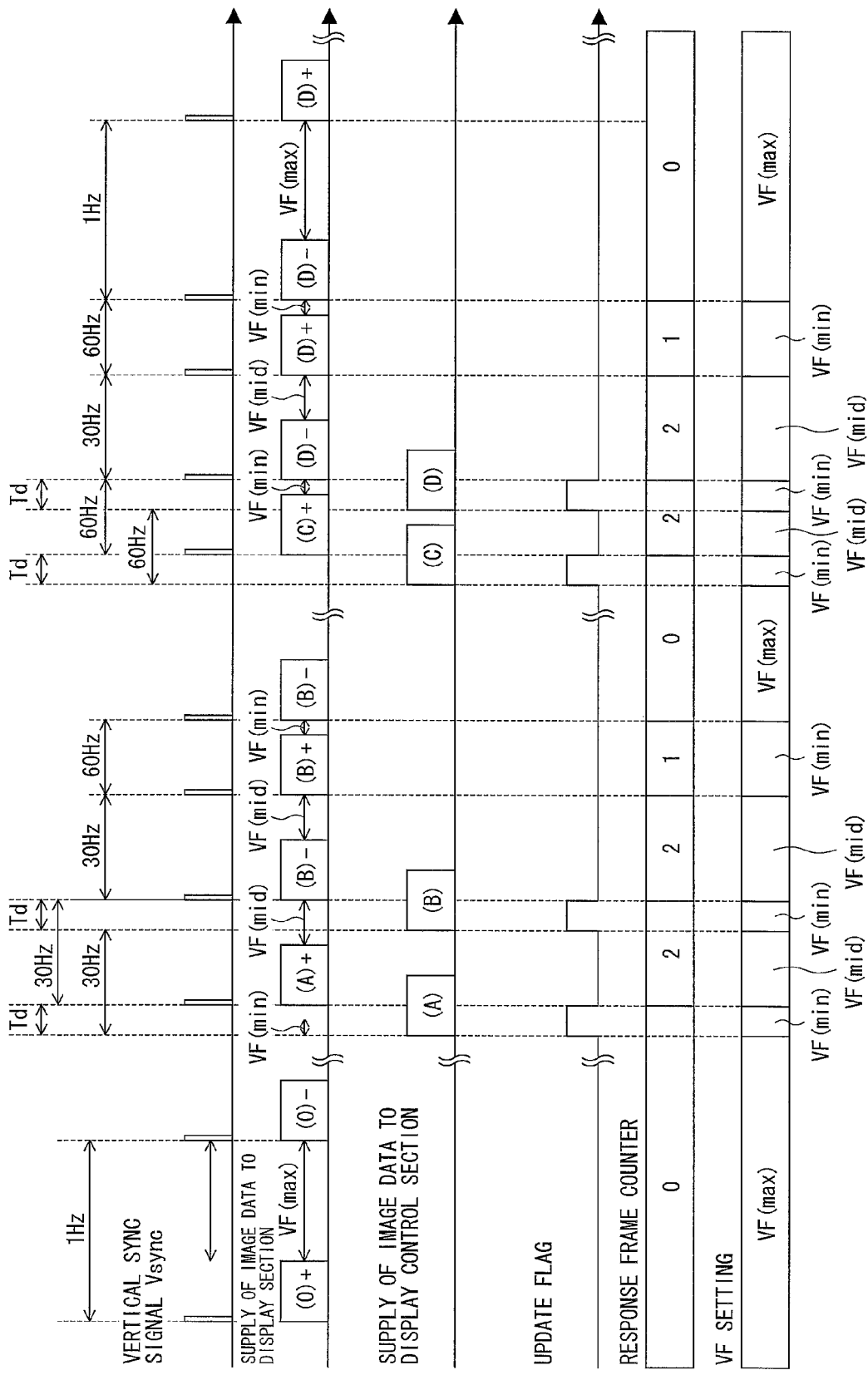

FIG. 5 is a timing diagram illustrating timings at which sets of image data are supplied to/from the display control section illustrated in FIG. 1.

DESCRIPTION OF EMBODIMENTS

The following description will discuss an embodiment of the present invention. Note that the present embodiment will describe a case where the present invention is applied to a liquid crystal display device provided to a mobile terminal. However, application of the present invention is not limited to a mobile terminal. The present invention can be applied to any device, provided that the any device is a liquid crystal display device or a device including a liquid crystal display device.

(1-1. Overall Configuration of Mobile Terminal 1)

Figure 2:
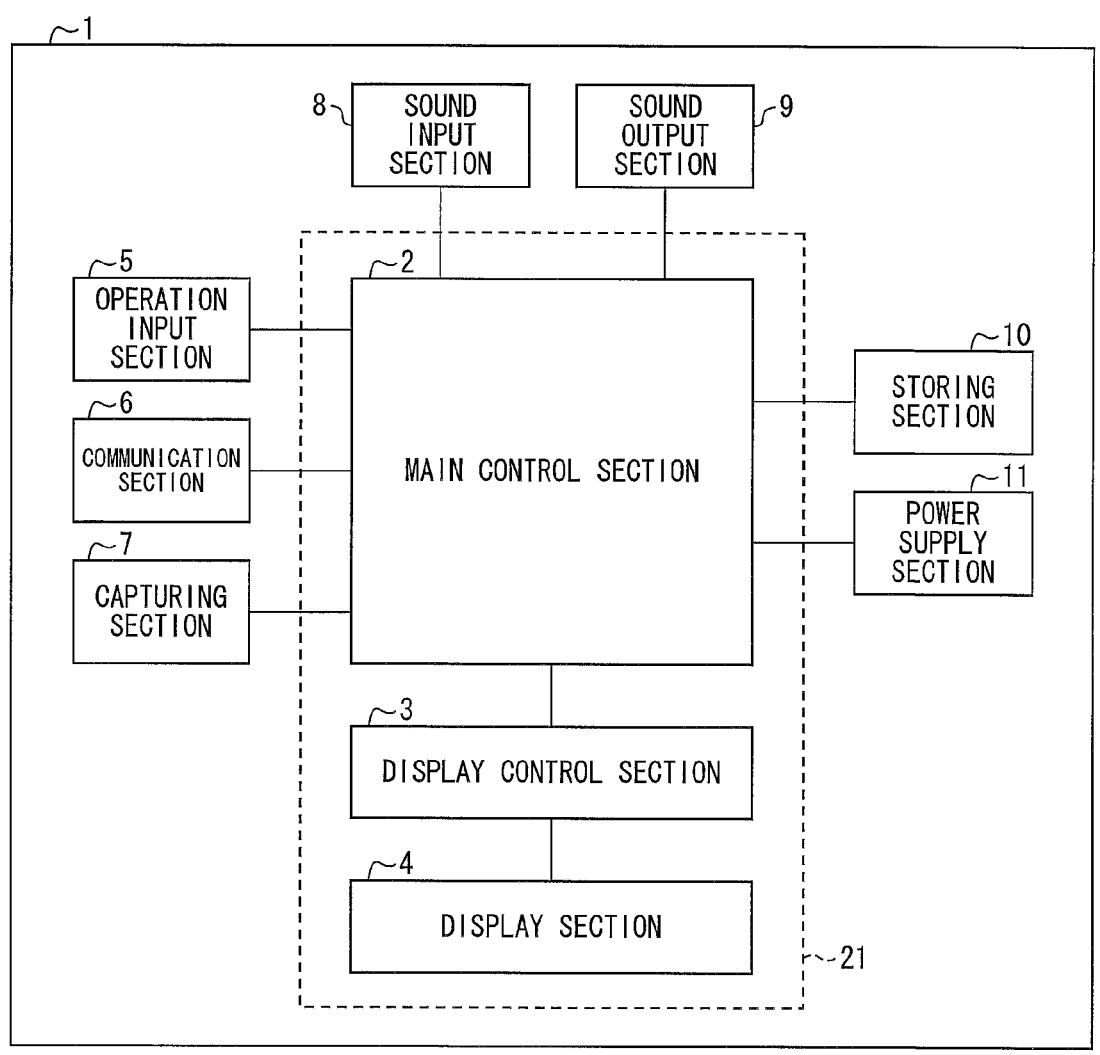
FIG. 2 is an explanatory diagram illustrating a configuration of the mobile terminal (liquid crystal display device) in accordance with the embodiment of the present invention.

FIG. 2 is an explanatory diagram illustrating a configuration of a mobile terminal (display device) 1 in accordance with the present embodiment. Note that examples of the mobile terminal 1 encompass a smartphone, a tablet terminal, a mobile phone, a PDA (Personal Digital Assistance), a notebook computer, and a portable game device.

As illustrated in FIG. 2, the mobile terminal 1 includes a main control section (host, host processor) 2, a display control section (image data output control device) 3, a display section (liquid crystal display section) 4, an operation input section 5, a communication section 6, a capturing section 7, an sound input section 8, an sound output section 9, a storing section 10, and a power supply section 11.

The main control section 2 carries out overall control (processing) with respect to the mobile terminal 1 itself. The main control section 2 is made up of, for example, a computer device constituted by (i) a processing section such as a CPU or a special purpose processor (each of which is not illustrated), (ii) a storing section such as an RAM, an ROM, and an HDD (each of which is not illustrated), and/or the like. The main control section 2 controls operation of each section of the mobile terminal 1 by (i) reading (a) various kinds of information stored in the storing section and (b) a program which is stored in the storing section and in accordance with which various kinds of control are carried out and (ii) executing the program.

Note that the main control section 2 supplies (transfers), to the display control section 3, for example, (i) various control signals, such as image data and an REQ (Request) signal, which are to be transferred to the display section 4 via the display control section 3, (ii) various control commands such as a handshake flag and a BTA (Bus Turnaround), and (iii) various packets such as a VSS (Vertical Sync Start) packet and a BS (Blanking Start) packet.

The display control section (LCD controller) 3 controls a timing at which image data, supplied from the main control section 2, is supplied to the display section 4.

Note that, as illustrated in FIG. 1, a display device 21 of the mobile terminal 1 in accordance with the present embodiment is made up of the main control section 2, the display control section 3, and the display section 4.

FIG. 1 is an explanatory diagram schematically illustrating a configuration of the display control section 3. As illustrated in FIG. 1, the display control section 3 includes a frame memory (memory) 31, a period control section 32, a timer 33, and a storing section 34. The storing section 34 includes a control information storing section 35, an update flag storing section 36, a response frame counter value storing section 37, a VF setting table storing section 38, and a VF setting value storing section 39.

The frame memory 31 is an image memory which stores therein image data that is transferred from the main control section 2 and that corresponds to at least 1 (one) frame (1 (one) screen).

The period control section 32 controls a timing at which image data, corresponding to 1 (one) screen, is read out from the frame memory 31 and supplied to the display section 4, by adjusting a length of a front porch period (setting VF period). In the display section 4, a timing at which voltages are applied to respective pixels of a liquid crystal display panel included in the display section 4 is controlled depending on the timing at which the image data is supplied from the display control section 3 to the display section 4. This causes a length of a non-refresh period, during which no voltages are applied to the respective pixels, to be controlled. The "front porch period" is a period from a start of a vertical blanking period to a start of operation (scan of scanning signal lines) in response to a vertical sync signal Vsync.

The period control section 32 is made up of, for example, a computer device constituted by (i) a processing section such as a CPU or a special purpose processor (each of which is not illustrated), (ii) a storing section such as an RAM, an ROM, and an HDD (each of which is not illustrated), and/or the like. The period control section 32 controls operation of each section of the mobile terminal 1 by (i) reading (a) various kinds of information stored in the storing section and (b) a program which is stored in the storing section and in accordance with which various kinds of control are carried out and (ii) executing the program. Operation of the period control section 32 will be later described in detail.

The timer 33 measures time elapsed since a time point at which the timer 33 was instructed to start measuring the time by the period control section 32. For example, the timer (Tod timer) 33 carries out a time measurement process so as to determine whether or not a predetermined delay time (predetermined time) Tod has elapsed since supply of new image data to the display control section 3 was started. A configuration of the timer 33 is not limited in particular, provided that the timer 33 has such a measurement function. The timer 33 can have a conventionally known configuration.

The storing section 34 stores therein various kinds of information used in a process carried out by the period control section 32. The storing section 34 includes a control information storing section 35, an update flag storing section 36, a response frame counter value storing section 37, a VF setting table storing section 38, and a VF setting value storing section 39. Note that a configuration of the storing section 34 is not limited in particular, provided that the various kinds of information are appropriately stored in and read out from the storing section 34. As the storing section 34, conventionally known various storing sections can be employed.

The control information storing section 35 stores therein various kinds of control information supplied from the main control section 2. The period control section 32 reads out, as necessary, the various kinds of control information stored in the control information storing section 35, and uses them so as to carry out display control or transmits them to the main control section 2. Examples of control commands transmitted from the main control section 2 to the display control section 3 include various sets of data used to set a parameter in each section (circuit) (for example, a reference value used to calculate an image size, a line size, a frequency, transfer waiting time, and a critical period). Examples of control commands transmitted from the display control section 3 to the main control section 2 include a handshake flag (later described).

The update flag storing section 36 stores therein an update flag indicating that update image data is supplied to the display control section 3. The update flag will be later described in detail. In the present embodiment, in a case where supply of update image data to the display control section 3 is started, the update flag is set to have a signal value of a High level. In a case where supply of the update image data to the display section 4 is started, the update flag is set to have a signal value of a Low level.

The response frame counter value storing section 37 stores therein a counter value of a response frame counter which counter value is used to set a timing at which display of update image data is started.

The VF setting table storing section 38 stores therein a VF setting table in which a counter value of the response frame counter is associated with a length of a front porch period (VF period).

The front porch period is an interval between frames, in each of which an image is displayed by the display section 4, that is, a period from a start of a vertical blanking period to a start of operation in response to a vertical sync signal. In the present embodiment, the front porch period can be changed by the period control section 32. The period control section 32 renews a counter value of the response frame counter as necessary, depending on, for example, a timing at which image data is supplied to/from the display control section 3. Furthermore, the period control section 32 sets a VF period by reading, from the VF setting table, the VF period associated with the counter value.

The VF setting value storing section 39 stores therein a setting value of a VF period set by the period control section 32.

(a) of FIG. 3 is an explanatory view illustrating an example of a VF setting table used in the present embodiment. According to the example illustrated in (a) of FIG. 3, the counter value of the response frame counter can be 2, 1 (one), or 0 (zero). In a case where the counter value is 2, the VF period is set to have an intermediate value (first predetermined time) $VF(mid)=\frac{1}{30} s-T_V (T_V=T_{VP}+T_{VS}+T_{VW})$. In a case where the counter value is 1 (one), the VF period is set to have a minimum value (second predetermined time) $VF(min)=\frac{1}{60} s-T_V$. In a case where the counter value is 0 (zero), the VF period is set to have a maximum value (third predetermined time) $VF(max)=1 s-T_V$. Note that $T_{VP}$ indicates a length of an active period VP of a Vsync pulse, $T_{VB}$ indicates a length of a vertical back porch period VB, and $T_{VW}$ indicates a length of an active data output period VW (each of which is measured in second (s)). The counter value of the response frame counter and how to set the VF period will be later described.

The display section 4 includes a liquid crystal display panel, a scanning line drive circuit, and data signal line drive circuit. The liquid crystal display panel includes (i) a pair of substrates at least one of which is transparent, (ii) a liquid crystal layer sandwiched between the pair of substrates, (iii) a plurality of scanning signal lines, (iv) a plurality of data signal lines, and (v) pixels provided at respective intersections of the plurality of scanning signal lines and the plurality of data signal lines. Each of the pixels has (a) an electrode via which a voltage is applied to the liquid crystal layer and (b) a switching element which switches, between an electrically connected condition and an electrically disconnected condition, the electrode and a data signal line connected to the switching element. Operation of the switching element is controlled with the use of a voltage applied to a scanning signal line connected to the switching element. The scanning line drive circuit controls, in accordance with various control signals supplied from the display control section 3, voltages to be applied to the respective plurality of scanning signal lines. The data signal line drive circuit controls, in accordance with image data and various control signals supplied from the display control section 3, voltages to be applied to the respective plurality of data signal lines. In the present embodiment, the display section 4 is configured such that, every time image data corresponding to 1 (one) screen is supplied from the display control section 3, voltages which are based on the image data are applied to the respective pixels.

Note that, in the present embodiment, every time voltages to be applied to the respective pixels are renewed, the data signal line drive circuit reverses a polarity of the voltages to be applied to the respective pixels. However, the present embodiment is not limited to such. Alternatively, the polarity of the voltages to be applied to the respective pixels can be reversed, for example, every several times the voltages to be applied to the respective pixels are renewed.

Further, the display section 4 is configured such that operation of part or all of the scanning line drive circuit and the data signal line drive circuit is stopped during a VF period during which a displayed image is not updated, that is, while display of image data is being continued by electric charges being retained which electric charges have been applied to the respective pixels in a previous frame, instead of voltages, which are based on the image data, being applied to the liquid crystal display panel. This allows the display section 4 to consume less electric power.

Note that a configuration of the liquid crystal display panel is not limited in particular, and conventionally known various liquid crystal display panels can be employed. In the present embodiment, an oxide semiconductor liquid crystal panel is employed in which, as a switching element provided in each pixel, one that includes a channel layer made up of an oxide semiconductor is employed.

The switching element, including the channel layer made up of the oxide semiconductor, can be reduced in size, as compared with conventionally widely used switching elements each including a channel layer made up of amorphous silicon. This allows the oxide semiconductor liquid crystal panel to (i) have an increased aperture ratio and, accordingly, (ii) realize brighter display. It is therefore possible to reduce electric power consumption, and possible to realize a high-definition display.

Furthermore, the oxide semiconductor is extremely high in OFF resistance, as compared with amorphous silicon. This allows electric charges, applied to the respective pixels, to be stably retained for a long time period. Therefore, the oxide semiconductor is particularly suitable for such a configuration that, as in the present embodiment, pause driving is carried out in which voltages are not applied to respective pixels of a liquid crystal display panel while there is no change in displayed image. Note that an amorphous oxide material made up of In (indium), Ga (gallium), Zn (zinc), and O (oxygen) is particularly suitable for the oxide semiconductor. Alternatively, a polycrystalline material typified by zinc oxide (ZnO) can be also employed.

The operation input section 5 receives an operation inputted by a user, and transfers the operation to the main control section 2. A configuration of the operation input section 5 is not limited in particular, and various operation keys can be employed as the operation input section 5. Note that, as the operation input section 5, a touch panel can be alternatively employed via which the user inputs an operation by touching a display screen of the display section 4.

The communication section 6 communicates with the other devices via a communication network. The communication network is not limited in particular. Examples of the communication network include the Internet, an intranet, an extranet, a LAN, ISDN, VAN, a CATV communications network, a virtual private network, a telephone network, a mobile telecommunications network, and a satellite communication network. Further, a transmission medium by which the communication network is constituted is not limited in particular. Examples of the transmission medium encompass: wired transmission media such as IEEE1394, a USB, a power-line carrier, a cable TV circuit, a telephone line, and ADSL (Asymmetric Digital Subscriber Line); and wireless transmission media such as infrared communication systems such as IrDA and a remote control, Bluetooth (Registered Trademark), IEEE802.11 wireless communication system, HDR (High Digital Rate), NFC (Near Field Communication), DLNA (Digital Living Network Alliance), a mobile phone network, a satellite circuit, and a digital terrestrial network.

The capturing section 7 captures an image of surroundings and generates image data.

The sound input section 8 collects an ambient sound and generates sound data.

The sound output section 9 outputs a sound in accordance with an instruction given by the main control section 2.

The storing section 10 is configured such that various kinds of information are stored therein and read out therefrom in accordance with an instruction given by the main control section 2. A configuration of the storing section 10 is not limited in particular. Examples of the storing section 10 encompasses (i) semiconductor memories such as a mask ROM, an EPROM, an EEPROM (Registered Trademark), and a flash ROM and (ii) logic circuits such as a PLD (Programmable Logic Device) and an FPGA (Field Programmable Gate Array).

The power supply section 11 supplies electric power to each section of the mobile terminal 1 so that the each section operates. In the present embodiment, the power supply section 11 includes a rechargeable battery. Electric power charged in the rechargeable battery is supplied to the each section of the mobile terminal 1. Note, however, that the power supply section 11 is not limited to such a configuration. The power supply section 11 can be alternatively configured to supply, to the each section of the mobile terminal 1, electric power supplied from outside (for example, a commercial electric power source and various electric power generators) of the mobile terminal 1.

(1-2. Operation of Period Control Section 32)

Next, how the period control section 32 controls a front porch period will be described below. FIG. 4 is a flowchart illustrating a flow of processes carried out by the period control section 32.

First, the period control section 32 determines whether or not new image data (image data corresponding to a new frame) is supplied from the main control section 2 to the display control section 3 (step S1). In a case where the period control section 32 determines, in the step S1, that no new image data is supplied from the main control section 2 to the display control section 3, the period control section 32 repeats the process of the step S1 (process of monitoring whether or not new image data is supplied).

On the other hand, in a case where the period control section 32 determines, in the step S1, that new image data is supplied from the main control section 2 to the display control section 3, the period control section 32 (i) starts writing, in the frame memory 31, image data thus supplied from the main control section 2 (step S2), (ii) resets the timer (Tod timer) 33 and causes the timer 33 to measure time (step S3), (iii) sets, to VF(min), a VF setting value VF stored in the VF setting value storing section 39 (step S4), and (iv) sets an update flag, stored in the update flag storing section 36, to have a signal value of a High level (value indicating that there is an update on image data) (step S5).

Thereafter, the period control section 32 determines, in accordance with a result of time measurement carried out by the timer 33, whether or not predetermined delay time (predetermined time) Tod has elapsed since supply of the new image data to the display control section 3 was started (step S6). The delay time Tod is set to such time that so-called tearing does not occur. The tearing is a problem that a timing at which image data is read out from the frame memory 31 catches up with a timing at which the image data is written in the frame memory 31, so that incomplete image data which is being written in the frame memory 31 is supplied to the display panel.

In a case where the period control section 32 determines, in the step S6, that the predetermined delay time Tod has not elapsed, the period control section 32 repeats the process of the step S6 (process of monitoring whether or not the predetermined delay time Tod has elapsed).

On the other hand, in a case where the period control section 32 determines, in the step S6, that the predetermined delay time Tod has elapsed, the period control section 32 sets a response frame counter value CV, stored in the response frame counter value storing section 37, to, for example, 2 which is a predetermined value (step S7).

Furthermore, the period control section 32 reads out the image data written in the frame memory 31, and starts supplying the image data to the display section 4 (step S8). Note that the image data is supplied to the display section 4, in order of (i) a period VP during which a vertical sync signal Vsync is activated (active period of a Vsync pulse), (ii) a vertical back porch period VB, (iii) an active data output period VW during which active data is supplied from the display control section to the display section 4, and then (iv) a vertical front porch VF, so that an image of the image data is displayed by the display section 4.

Moreover, the period control section 32 sets the update flag, stored in the update flag storing section 36, to have a signal value of a Low Level (value indicating that there is no update on image data) (step S9).

The period control section 32 then determines whether or not supply of the image data (corresponding to 1 (one) frame) to the display control section 4 has been completed (that is, whether or not the supply of the image data has been completed over the periods VP through VF) (step S10). In a case where the period control section 32 determines, in the step S10, that the supply of the image data has not yet been completed, the period control section 32 continues the process of the step S10 (process of monitoring whether or not supply of image data has been completed).

In a case where the period control section 32 determines, in the step S10, that the supply of the image data has been completed, the period control section 32 determines whether or not next image data (new image data) is supplied from the main control section 2 to the display control section 3 (step S11).

In a case where the period control section 32 determines, in the step S11, that next image data is supplied from the main control section 2 to the display control section 3, the period control section 32 returns to the process of the step S2, and carries out the processes of the step S2 and the steps after the step S2 with respect to the next image data.

In a case where the period control section 32 determines, in the step S11, that next image data is not supplied from the main control section 2 to the display control section 3, the period control section 32 determines whether or not the response frame counter value CV, stored in the response frame counter value storing section 37, is 0 (zero) (CV=0 (zero)) (step S12).

In a case where the period control section 32 determines, in the step S12, that the response frame counter value CV is not 0 (zero) (CV≠0 (zero)), the period control section 32 renews the response frame counter value CV, stored in the response frame counter value storing section 37, by subtracting 1 (one) from the response frame counter value CV (CV=CV−1 (one)) (step S13), and then returns to the process of the step S8.

On the other hand, in a case where the period control section 32 determines, in the step S12, that the response frame counter value CV is 0 (zero), the period control section 32 ends the processes by carrying out given ending operation.

FIG. 5 is a timing diagram illustrating timings at which sets of image data are supplied to/from the display control section 3.

As has been described, in a case where image data, corresponding to a new frame, is supplied to the display control section 3, an update flag is set to have a High level, and a VF setting value is set to VF(min). Then, in a case where a predetermined delay time Tod has elapsed since supply of the image data, corresponding to the new frame, to the display control section 3 was started, (i) the image data, corresponding to the new frame, and a vertical sync signal Vsync are supplied to the display section 4, (ii) the update flag is reset to have a Low level, and (iii) a response frame counter value CV is set to 2.

Therefore, as illustrated in FIG. 5, image data, which corresponds to each of frames A through D and which is supplied to the display control section 3, starts to be supplied to the display section 4, in a case where the predetermined delay time Tod has elapsed since supply of the image data to the display control section 3 was started.

In each frame, in a case where next image data, corresponding to a next frame, is not supplied to the display control section 3 when a VF period, associated with the response frame counter value CV, has elapsed since supply of image data, corresponding to the each frame, to the display section 4 was started, the image data, previously supplied to the display section 4, is again supplied to the display section 4. The response frame counter value CV is renewed every time image data, corresponding to an identical frame, is supplied to the display section 4. In the present embodiment, in a case of the first supply of the image data, the response frame counter value CV is set to 2. In a case of the second supply of the image data, the response frame counter value CV is set to 1 (one). In a case of the third supply and subsequent supply of the image data, the response frame counter value CV is set to 0 (zero). Further, in the present embodiment, in a case where the response frame counter value CV is 2, the VF period is set to VF(mid)=1/30 s−$T_V$. In a case where the response frame counter value CV is 1 (one), the VF period is set to VF(min)=1/60 s−$T_V$. In a case where the response frame counter value CV is 0 (zero), the VF period is set to VF(max)=1 s−$T_V$.

With this arrangement, in a case where next image data, corresponding to a next frame, is not supplied to the display control section 3, (i) the second supply of the image data, corresponding to the frame (D), to the display section 4 is started when a period VF(mid)=1/30 s−$T_V$ has elapsed since the first supply of the image data was completed, (ii) the third supply of the image data, corresponding to the frame (D), to the display section 4 is started when a period VF(min)=1/60 s−$T_V$ has elapsed since the second supply of the image data was completed, (iii) the fourth supply of the image data, corresponding to the frame (D), to the display section 4 is started when a period VF(max)=1 s−$T_V$ has elapsed since the third supply of the image data was completed, and then (iv) the image data, corresponding to the frame (D), is supplied to the display section 4 every time the period VF(max)=1 s−$T_V$ elapses (see supply of the image data corresponding to the frame (D) illustrated in FIG. 5).

Note that the symbols "+" and "−", added next to the reference signs of the frames (frames (A), (B), (C), and (D)) to each of which image data corresponds, illustrated in FIG. 5 each indicate a polarity of voltages which the display section 4 applies to the respective pixels of the liquid crystal display panel. That is, in the present embodiment, in a case where the display section 4 applies voltages, which are based on image data, to the respective pixels of the liquid crystal display panel, the display section 4 reverses, for each frame, a polarity of the voltages to be applied to the respective pixels.

(1-3. Effect Brought about by Present Embodiment)

As has been described, in the present embodiment, an interval, between (i) when the first supply of image data, corresponding to 1 (one) frame, from the display control section 3 to the display section 4 is completed and (ii) when the second supply of the image data from the display control section 3 to the display section 4 is started, is set to VF(mid)=1/30 s−$T_V$. Accordingly, in a case where a 30 Hz video image is displayed in which image data is updated every 1/30 s (in a cycle of 30 Hz), it is possible to prevent image data, corresponding to a pervious frame, from being re-supplied to the display section 4 after the image data, corresponding to the previous frame, is supplied to the display section 4 and before next image data, corresponding to a next frame, is supplied to the display control section 3. This makes it possible to prevent unnecessary re-supply of image data, and to reduce electric power consumption.

That is, in a case where the next image data, corresponding to the next frame, is supplied to the display control section 3 1/30 s after the previous image data, corresponding to the previous frame, is supplied to the display control section 3, it is possible to prevent an increase in number of times of writing the previous image data in the pixels of the liquid crystal display panel while causing no deterioration in display quality, by causing the second supply of the previous image data, corresponding to the previous frame, not to be carried out.

Furthermore, in the present embodiment, an interval, between (i) when the second supply of image data, corresponding to each frame, from the display control section 3 to the display section 4 is completed and (ii) when the third supply of the image data from the display control section 3 to the display section 4 is started, is set to VF(min)=1/60 s−$T_V$. Accordingly, in a case where the image data is not updated even when 1/30 s or more has elapsed since last update of the image data, it is possible to appropriately display an image based on the image data by re-supplying the image data in a short cycle of 1/60 s and promptly applying voltages to the display panel of the display section 4.

Moreover, in the present embodiment, an interval, between (i) when the third supply of the image data, corresponding to the each frame, from the display control section 3 to the display section 4 is completed and (ii) when the fourth supply of the image data from the display control section 3 to the display section 4 is started, is set to VF(max)=1 s−$T_V$. Similarly, intervals which come after the fourth supply and subsequent supply of the image data are completed are each set to VF(max)=1 s−$T_V$. By thus prolonging a cycle of re-supplying image data, while there is no update on the image data, so as to reduce a frequency of applying voltages to the display panel of the display section 4, it is possible to appropriately display an image which is based on the image data and possible to reduce electric power consumption.

In the present embodiment, it is possible to improve a display quality and possible to reduce electric power consumed by the display section 4, as has been described. Therefore, in a case where the display section 4 is driven with the use of electric power supplied from the rechargeable battery, it is possible to extend continuous use hours of the rechargeable battery. For this reason, a method, in accordance with the present embodiment, of controlling a timing at which image data is supplied from the display control section (image data output control device) 3 to the display section 4 is particularly suitable for a configuration in which a liquid crystal display device is driven with the use of electric power supplied from a rechargeable battery (for example, a smartphone, a tablet terminal, a mobile phone, a PDA (Personal Digital Assistance), a notebook computer, and a portable game device).

Note that, in the present embodiment, a VF period, between (i) when the first supply of image data, corresponding to each frame, from the display control section 3 to the display section 4 is completed and (ii) when the second supply of the image data from the display control section 3 to the display section 4 is started, is set to VF(mid)=1/30 s−$T_V$. However, the present embodiment is not limited to such. For example, in a case where a video of a video signal whose image updating cycle is 24 Hz is displayed, the VF period can be set to VF(mid)=1/24 s−$T_V$ as illustrated in (b) of FIG. 3. Alternatively, in a case where an image, such as an one-segment broadcast, whose image updating cycle is 15 Hz is displayed, the VF period can be set to VF(mid)=1/15 s−$T_V$ as illustrated in (c) of FIG. 3. That is, the present embodiment can be arranged such that, depending on a type of image data, (a) time, between (i) when supply of previous image data, corresponding to a previous frame, to the display section 4 is completed and (ii) when supply of next image data, corresponding to a next frame, to the display section 4 is started, is predicted and (b) a length of VF(mid) is set so that the second supply of the previous image data is started in a case where the next image data is not supplied to the display control section 3 within the time thus predicted.

The present embodiment can be alternatively arranged such that a length of VF(mid) is manually set by, for example, a user operating the operation input section 5. Alternatively, the present embodiment can be arranged such that (a) the main control section 2 or the display control section 3 is provided with a determination section (not illustrated) which determines (i) a type of image data whose image is to be displayed (for example, which one of a 30 Hz video image, a 24 Hz video image, and an one-segment image the image data, whose image is to be displayed, is) or (ii) an image updating cycle of the image data and (b) the main control section 2 or the display control section 3 sets a value of VF(mid) depending on a result of determination made by the determination section.

Note also that, in the present embodiment, the interval which comes after the third supply of image data to display section 4 is completed is set to VF(max)=1 s−$T_V$. However, this interval is not limited to VF(max), and can be alternatively set to a period longer than 1 Hz.

Note also that, in the present embodiment, the interval which comes after the third supply of image data to the display section 4 is completed is set to VF(max). However, the interval is not limited to VF(max). Alternatively, the interval which comes after the second supply of the image data to the display section 4 is completed can be set to VF(max). Alternatively, the interval, between (i) when the third supply of the image data to the display section 4 is completed and (ii) when the fourth supply of the image data to the display section 4 is started, can be set to VF(min), and an interval which comes after the fourth supply of the image data to the display section 4 is completed can be set to VF(max). Alternatively, intervals which come after the third supply to the nth (n is an integer not less than 3) supply of the image data to the display section 4 are completed can be each set to VF(min), and intervals which come after the (n+1)th supply and subsequent supply of the image data to the display section 4 are completed can be each set to VF(max).

Note also that the present embodiment can be alternatively arranged as follows. That is, the main control section 2 compares successive frames. Merely in a case where there is a change between (i) a previous frame whose corresponding image data is previously supplied to the display control section 3 and (ii) a next frame, the main control section 2 supplies next image data, corresponding to the next frame, to the display control section 3. Then, the display control section 3 sequentially writes, in the frame memory 31, the image data supplied from the main control section 2. That is, the present embodiment can be arranged such that, in a case where the previous frame whose corresponding image data is previously supplied to the display control section 3 is identical to the next frame (in a case where there is no update on displayed data), the main control section 2 does not supply the next image data, corresponding to the next frame, to the display control section 3 (transfer of the next image data from the main control section 2 to the display control section 3 is stopped). Alternatively, the present embodiment can be arranged as follows. That is, the main control section 2 successively supplies image data, corresponding to each frame, to the display control section 3. Merely in a case where there is update on displayed data, the main control section 2 supplies, in addition to image data, a signal or information indicating that there is update on the image data which is being currently transmitted. The display control section 3 writes the image data in the frame memory 31, merely in a case where the signal or information, indicating that there is update on the image data which is being currently transmitted, indicates that there is update on the displayed data.

(1-4. Example of Program)

Each block of the mobile terminal 1, particularly, the main control section 2 and/or the period control section 32 can be implemented by hardware such as a logic circuit provided on an integrated circuit (IC chip) or can alternatively be implemented by software with the use of a CPU (Central Processing Unit).

In the latter case, the mobile terminal 1 includes: a CPU which executes instructions of a program that carries out the foregoing functions; and a storage device (recording medium) such as a ROM (Read Only Memory) which stores therein the program, a RAM (Random Access Memory) in which the program is loaded, and a memory which stores therein the program and various sets of data. The object of the present invention can be attained by (i) supplying, to the mobile terminal 1, the recoding medium in which program codes (an executable program, an intermediate code program, and a source program) of a program for controlling the mobile terminal 1, which is implemented by software that executes the foregoing functions, are computer-readably recorded and (ii) causing a computer (or a CPU or an MPU) of the mobile terminal 1 to read and execute the program codes recorded in the recording medium.

Examples of the recording medium includes the following non-transitory tangible mediums: (i) tapes such as a magnetic tape and a cassette tape; (ii) disks including magnetic disks, such as a Floppy (Registered Trademark) disk and a hard disk, and optical disks, such as a CD-ROM, an MO, an MD, a DVD, and a CD-R; (iii) cards such as an IC card (including a memory card) and an optical card; (iv) semiconductor memories such as a mask ROM, an EPROM, an EEPROM (Registered Trademark), and a flash ROM; and (v) logic circuits such as a PLD (Programmable Logic Device) and an FPGA (Field Programmable Gate Array)

The mobile terminal 1 can be connected to a communication network so that the program codes are supplied to the mobile terminal 1 via the communication network. This communication network is not limited to any particular one, provided that the program codes can be transmitted. Examples of the communication network include the Internet, an intranet, an extranet, a LAN, ISDN, VAN, a CATV communications network, a virtual private network, a telephone network, a mobile telecommunications network, and a satellite communication network. Further, a transmission medium by which the communication network is constituted is not limited to any particular one, provided that the program codes can be transmitted. Examples of the transmission medium include: wired transmission media such as IEEE1394, a USB, a power-line carrier, a cable TV circuit, a telephone line, and ADSL (Asymmetric Digital Subscriber Line); and wireless transmission media such as infrared communication systems such as IrDA and a remote control, Bluetooth (Registered Trademark), IEEE802.11 wireless communication system, HDR (High Digital Rate), NFC (Near Field Communication), DLNA (Digital Living Network Alliance), a mobile phone network, a satellite circuit, and a digital terrestrial network. Note that the present invention can also be implemented in a form of a computer data signal in which the program codes are embodied by an electronic transmission and which is embedded in carrier waves.

[Summary]

An image data output control device of the present invention is an image data output control device that controls a timing at which image data, corresponding to 1 (one) screen, is supplied to a liquid crystal display section, the liquid crystal display section applying, to respective pixels, voltages which are based on the image data, every time the image data is supplied to the liquid crystal display section, the device including: a memory in which image data is stored; and a period control section for controlling a timing at which the image data stored in the memory is read out and supplied to a liquid crystal display section, the period control section starting the first supply of the image data to the liquid crystal display section, in a case where predetermined time has elapsed since the image data, corresponding to 1 (one) screen, started to be written in the memory, the period control section starting the second supply of the image data, of which the first supply has been carried out, to the liquid crystal display section, in a case where next image data, corresponding to next 1 (one) screen, does not start to be written in the memory even when first predetermined time has elapsed since the first supply of the image data was completed.

According to the above configuration, in a case where next image data, corresponding to next 1 (one) screen, does not start to be written in the memory even when the first predetermined time has elapsed since the first supply of image data was completed, the period control section starts the second supply of the image data, of which the first supply has been carried out, to the liquid crystal display section. With this, in a case where there is no update on image data whose image is to be displayed on the liquid crystal display section, the image data, which corresponds to 1 (one) screen and which has been previously supplied to the liquid crystal display section, is again supplied to the liquid crystal display section, and voltages which are based on the image data are again applied to respective pixels. It is therefore possible to appropriately control, depending on the image data, an orientation state of liquid crystal molecules in each of the pixels, regardless of an orientation state of the liquid crystal molecules in the each of the pixels which orientation state corresponds to an image prior to an update image. This makes it possible to appropriately update a displayed image.

The image data output control device can be arranged such that: in a case where next image data, corresponding to next 1 (one) screen, does not start to be written in the memory even when second predetermined time has elapsed since the second supply of the image data was completed, the period control section starts the third supply of the image data to the liquid crystal display section; and the period control section sets the first predetermined time to be longer than the second predetermined time.

According to the above configuration, in a case where next image data, corresponding to next 1 (one) screen, does not start to be written in the memory even when the second predetermined time has elapsed since the second supply of the image data was completed, the period control section (i) starts the third supply of the image data to the liquid crystal display section and (ii) sets a period, between when the first supply of the image data is completed and when the second supply of the image data is started, to be longer than a period between when the second supply of the image data is completed and when the third supply of the image data is started. Therefore, in a case where next image data, corresponding to a next screen, is written in the memory during the period between when the first supply of the image data is completed and when the second supply of the image data is started, it is possible to supply the next image data, corresponding to the next frame, to the liquid crystal display section, instead of again supplying the image data whose image has been previously displayed. Therefore, it is possible to reduce a frequency of applying, to a liquid crystal display panel, voltages which are based on the image data, and accordingly possible to reduce electric power consumption, as compared with a case where the period, between when the first supply of the image data is completed and when the second supply of the image data is started, is set to be equal to or shorter than the period between when the second supply of the image data is completed and when the third supply of the image data is started.

Further, the image data output control device can be arranged such that: in a case where next image data, corresponding to next 1 (one) screen, does not start to be written in the memory even when the second predetermined time has elapsed since the third supply of the image data was completed, the period control section repeats, to the nth (n is an integer not less than 3) supply, a process of starting another supply of the image data to the liquid crystal display section; in a case where next image data, corresponding to next 1 (one) screen, does not start to be written in the memory even when third predetermined time has elapsed since the nth supply of the image data was completed, the period control section starts the (n+1)th supply of the image data to the liquid crystal display section; and the period control section sets the third predetermined time to be longer than each of the first predetermined time and the second predetermined time.

According to the above configuration, a period, between when the nth supply of the image data is completed and when the (n+1)th supply of the image data is started, is set to be longer than (i) an interval between when the first supply of the image data is completed and when the second supply of the image data is started and (ii) each of intervals which come after the second supply and subsequent supply of the image data are completed. It is therefore possible to reduce a frequency of applying, to the liquid crystal display panel, voltages which are based on the image data, and accordingly possible to reduce electric power consumption.

Further, the image data output control device can be arranged such that, in a case where next image data, corresponding to next 1 (one) screen, does not start to be written in the memory even when the third predetermined time has elapsed since the (n+1)th supply of the image data was completed, the period control section repeats the process of starting the another supply of the image data to the liquid crystal display section.

According to the above configuration, the (n+1)th supply and subsequent supply of the image data are each started every time the third predetermined time, which is longer than each of the first predetermined and the second predetermined time, elapses. It is therefore possible to reduce a frequency of applying, to the liquid crystal display panel, voltages which are based on the image data, and accordingly possible to reduce electric power consumption.

Further, the image data output control device can be arranged such that, every time image data corresponding to 1 (one) screen is supplied from a host to the image data output control device which image data is different from image data, corresponding to 1 (one) screen, whose image is previously displayed on the liquid crystal display section, the image data thus supplied from the host starts to be written in the memory.

According to the above configuration, by starting writing the image data in the memory in a case where an image displayed on the liquid crystal display section is to be updated, it is possible to appropriately update such a displayed image. Meanwhile, in a case where the image displayed on the liquid crystal display section is not to be updated, it is possible to write image data, which corresponds to 1 (one) frame and whose image is previously displayed on the liquid crystal display section, in the pixels multiple times at the aforementioned timings. It is therefore possible to appropriately update a displayed image.

A display device of the present invention is a display device including: an image data output control device described above; a liquid crystal display section which applies, to respective pixels, voltages which are based on image data, every time the image data, corresponding to 1 (one) screen, is supplied from the image data output control device to the liquid crystal display section.

According to the above configuration, it is possible to appropriately control, depending on the image data, an orientation state of the liquid crystal molecules in each of the pixels, regardless of an orientation state of the liquid crystal molecules in the each of the pixels which orientation state corresponds to an image prior to an update image, and accordingly possible to appropriately update a displayed image.

The display device can be arranged such that the liquid crystal display section reverses a polarity of the voltages applied to the respective pixels, every time or every several times the voltages applied to the respective pixels are renewed.

According to the above configuration, it is possible to prevent image sticking caused by a problem that an orientation state of the liquid crystal molecules does not change depending on applied voltages, and possible to stably drive the display device.

Further, the display device can be arranged such that: the liquid crystal display section includes (i) data signal lines via which the voltages, which are based on the image data, are applied to the respective pixels and (ii) switching elements each of which is provided for one or more of the pixels, each of the switching elements switching, between an electrically connected condition and an electrically disconnected condition, a corresponding one(s) of the data signal lines and a corresponding one(s) of the pixels; and each of the switching elements is a thin-film transistor element including a channel layer made up of an oxide semiconductor. The oxide semiconductor can contain, for example, indium, gallium, zinc, and oxygen.

According to the above configuration, as the switching elements each of which is provided for one or more of the pixels, switching elements are employed each of which includes a channel layer made up of an oxide semiconductor that is high in OFF resistance. It is therefore possible to stably maintain display even in a case where a length of a non-refresh period is variably set.

Note that the image data output control device can be realized by a computer. In this case, the scope of the present invention encompasses (i) a program for causing the computer to function as the period control section of the image data output control device and (ii) a computer-readable recording medium in which the program is recorded.

The present invention is not limited to the description of the embodiments, but may be altered by a skilled person in the art within the scope of the claims. An embodiment derived from a proper combination of technical means disclosed in different embodiments is also encompassed in the technical scope of the present invention. Furthermore, a combination of technical means disclosed in different embodiments can make a new technical feature.

INDUSTRIAL APPLICABILITY

The present invention is applicable to (i) an image data output control device which controls a timing at which image data is supplied to a liquid crystal display section and (ii) a display device including the image data output control device and the liquid crystal display section.

REFERENCE SIGNS LIST

1 Mobile terminal (display device)
2 Main control section (host)
3 Display control section (image data output control device)
4 Display section (liquid crystal display section)
5 Operation input section
6 Commutation section
7 Capturing section
8 Sound input section
9 Sound output section
10 Storing section
11 Power supply section (rechargeable battery)
21 Display device
31 Frame memory
32 Period control section 33 Timer
34 Storing section
35 Control information storing section
36 Update flag storing section
37 Response frame counter value storing section
38 VF setting table storing section
39 VF setting value storing section
CV Response frame counter value
Tod Delay time (predetermined time)
VF(mid) VF period (first predetermined time)
VF(min) VF period (second predetermined time)
VF(max) VF period (third predetermined time)

The invention claimed is:

1. An image data output control device that controls a timing at which image data, corresponding to 1 (one) screen, is supplied to a liquid crystal display, the liquid crystal display applying, to respective pixels, voltages which are based on the image data, every time the image data is supplied to the liquid crystal display, the device comprising:
a memory to store and retain image data which has been inputted and corresponds to 1 (one) screen until next image data corresponding to a next 1 (one) screen is inputted; and
period control circuitry that controls a timing at which the image data stored in the memory is read out and supplied to a liquid crystal display, wherein
the period control circuitry starts a first supply of the image data to the liquid crystal display, in a case when a predetermined delay time has elapsed since the image data started to be written in the memory,
in a case when the next image data does not start to be written in the memory even when a first predetermined time has elapsed since the first supply of the image data was completed, the period control circuitry starts a second supply of the image data to the liquid crystal display, the image data in the second supply being identical to the image data in the first supply,
in a case where the next image data does not start to be written in the memory even when a second predetermined time has elapsed since the second supply of the image data was completed, the period control circuitry starts a third supply of the image data to the liquid crystal display; and
the period control circuitry sets the first predetermined time to be longer than the second predetermined time.

2. The image data output control device as set forth in claim 1, wherein:
in a case when the next image data does not start to be written in the memory even when the second predetermined time has elapsed since the third supply of the image data was completed, the period control circuitry repeats, to the nth (n is an integer not less than 3) supply, supplying the image data to the liquid crystal display;
in a case when the next image data does not start to be written in the memory even when a third predetermined time has elapsed since the nth supply of the image data was completed, the period control circuitry starts the (n+1)th supply of the image data to the liquid crystal display; and
the period control circuitry sets the third predetermined time to be longer than each of the first predetermined time and the second predetermined time.

3. The image data output control device as set forth in claim 2, wherein,
in a case when the next image data does not start to be written in the memory even when the third predetermined time has elapsed since the (n+1)th supply of the image data was completed, the period control circuitry repeats supplying the image data to the liquid crystal display.

4. A display device comprising:
the image data output control device recited in claim 1;
the liquid crystal display which applies, to respective pixels, voltages which are based on image data, every time the image data is supplied from the image data output control device to the liquid crystal display.

5. The display device as set forth in claim 4, wherein the liquid crystal display reverses a polarity of the voltages applied to the respective pixels, every time or every several times the voltages applied to the respective pixels are renewed.

6. The display device as set forth in claim 4, wherein:
the liquid crystal display includes (i) data signal lines via which the voltages, which are based on the image data, are applied to the respective pixels and (ii) switching elements each of which is provided for one or more of the pixels, each of the switching elements switching, between an electrically connected condition and an electrically disconnected condition, a corresponding one(s) of the data signal lines and a corresponding one(s) of the pixels; and
each of the switching elements is a thin-film transistor element including a channel layer made up of an oxide semiconductor.

7. The display device as set forth in claim 6, wherein the oxide semiconductor contains indium, gallium, zinc, and oxygen.

8. A non-transitory computer-readable recording medium in which a program for causing a computer to function as the period control circuitry of the image data output control device recited in claim 1 is recorded.

* * * * *